United States Patent [19]

Narita et al.

[11] Patent Number: 5,119,220

[45] Date of Patent: Jun. 2, 1992

[54] LIQUID CRYSTAL DISPLAY DEVICE WITH A PHASE PLATE FOR SHADOW COMPENSATION

[75] Inventors: Kenichi Narita; Takeshi Suzaki, both of Tottori, Japan

[73] Assignees: Sanyo Electric Co., Ltd., Osaka; Tottori Sanyo Electric Co., Ltd., Tottori, both of Japan

[21] Appl. No.: 381,631

[22] PCT Filed: Jan. 25, 1989

[86] PCT No.: PCT/JP89/00069

§ 371 Date: Jul. 26, 1989

§ 102(e) Date: Jul. 26, 1989

[87] PCT Pub. No.: WO89/07282

PCT Pub. Date: Aug. 10, 1989

[30] Foreign Application Priority Data

Jan. 28, 1988 [JP] Japan ................... 63-18000
Jun. 8, 1988 [JP] Japan ................... 63-141293
Nov. 7, 1988 [JP] Japan ................... 63-280720

[51] Int. Cl.$^5$ .............................. G02F 1/133
[52] U.S. Cl. ......................... 359/73; 359/63
[58] Field of Search ............... 350/333, 337, 334, 341, 350/339 R, 347 E, 347 R, 346

[56] References Cited

U.S. PATENT DOCUMENTS

| | | | |
|---|---|---|---|
| 4,019,808 | 4/1977 | Scheffer | 350/335 |
| 4,232,948 | 11/1980 | Shanks | 350/335 |
| 4,385,806 | 5/1983 | Fergason | 350/332 |
| 4,443,065 | 4/1984 | Funada et al. | 350/335 |
| 4,522,468 | 6/1985 | Goscianski | 350/347 E |
| 4,634,229 | 6/1987 | Amstutz et al. | 350/341 |
| 4,664,482 | 5/1987 | Kando et al. | 350/346 |
| 4,697,884 | 10/1987 | Amstutz et al. | 350/341 |
| 4,759,612 | 7/1988 | Nakatsuka et al. | 350/337 |
| 4,852,976 | 8/1989 | Suzuki | 350/337 |
| 4,889,412 | 12/1989 | Clerc et al. | 350/339 R |
| 4,906,073 | 3/1990 | Hunahata et al. | 350/346 |
| 4,909,606 | 3/1990 | Wada et al. | 350/347 E |
| 4,936,654 | 6/1990 | Suzaki et al. | 350/337 |
| 4,973,137 | 11/1990 | Kozaki | 350/347 E |
| 4,984,873 | 1/1991 | Takiguchi et al. | 350/347 E |

FOREIGN PATENT DOCUMENTS 0246842 11/1987 European Pat. Off. .
0000600 1/1980 Japan .
192014 8/1988 Japan .

Primary Examiner—Stanley D. Miller
Assistant Examiner—Tai V. Duong
Attorney, Agent, or Firm—W. G. Fasse; D. H. Kane, Jr.

[57] ABSTRACT

A field effect type liquid crytal display device suitable for use in a high level multiplexing drive, has liquid crystal molecules twisted with an angle from 180° to 350° which are held between two polarizers. The liquid crystal display device generates an interference color due to a birefringent effect of liquid crystal. The occurrence the of this interference color can be prevented by laminating color compensation plates but if the thickness of the optical system increases, a deviation in a display position or a change in the contrast occurs dependent on the observing direction. A phase compensation for the color interference of the liquid crystal is achieved by setting the retardation of the liquid crystal cells having a large twist angle of the liquid crystal molecules and by laminating thin phase plates. Thus, the display quality is improved and the optical axis of an achromatic display can be easily adjusted.

16 Claims, 5 Drawing Sheets

LIQUID CRYSTAL DISPLAY DEVICE WITH A PHASE PLATE FOR SHADOW COMPENSATION

TITLE OF THE INVENTION

The present invention relates to liquid crystal display devices which are suitable for use in high level multiplexing drives providing a display which is easy to see.

DESCRIPTION OF THE BACKGROUND ART

Recently, field-effect type liquid crystal display devices having a twisted structure of liquid crystal molecules have been developed, which provide a wide range of high contrast (namely, a wide visual range) and which enabled high level multiplexing drive. In such liquid crystal display devices, liquid crystal molecules are oriented with a twist angle of 180° to 360° and a liquid crystal layer is placed between two polarizers. One of such liquid crystal display devices is disclosed for example in EPO-0131216 A3. In such a liquid crystal display device, the display color appears bluish or yellowish due to birefringence of the liquid crystal.

On the other hand, if two liquid crystal panels are provided one upon another for phase compensation as disclosed for example in U.S. Pat. No. 4,443,065, the background color can be made close to white.

The principle of the method of U.S. Pat. No. 4,443,065 will be briefly described. The hue observed due to birefringence of the liquid crystal is an interference color, which appears because a beam is elliptically polarized in a liquid crystal layer. Consequently, an achromatic color can be obtained by twisting back the once twisted beam. For this purpose, a liquid crystal panel having the same characteristics as a liquid crystal panel used for driving is placed thereon, whereby the liquid crystal panel is used for achromatization (compensation).

However, since such liquid crystal panels include two liquid crystal cells placed one upon another, the entire body of the display device becomes thick, which unfavorably causes a shadow or remote-appearing image or a change in contrast due to parallax (dependent on the observing direction). Further, such liquid crystal panels have a large number of pixels because they are suited for a high level multiplexing drive, and accordingly have a large display area. In addition, since the interference color depends also on the thickness of a liquid crystal layer, a strict control is required for attaining a uniform thickness of the liquid crystal layer and stable characteristics over a wide area. As a result, the manufacturing efficiency is lowered and the manufacturing costs are increased.

On the other hand, in order to adjust the hue in a liquid crystal display device, the method of using a ¼ wavelength plate or a phase plate is conventionally used as disclosed for example in U.S. Pat. No. 4,232,948 or Japanese Patent Laying-Open No. 600/1980. However, although coloring and achromatization are simply regarded as being based on opposite theories, it is practically difficult to effect achromatization by circular polarization or using a ¼ wavelength plate. This is so because a liquid crystal layer has complicated light transmitting characteristics although a wavelength plate ($\lambda$ plate) has effects on specified wavelengths of light. Further, it is difficult to adjust the optical characteristics of the wavelengths plate and of the liquid crystal layer since the quality of display is lowered if the liquid crystal layer does not have stable characteristics over a wide display area. Therefore, phenomena such as the appearance of an other interference color, of a darkened display or a lowered contrast occur. These phenomena unfavorably lower the quality of the display.

There has been proposed another technique which uses a uniaxially stretched film which is polarized as for use in a liquid crystal display device, as disclosed, for example, in Japanese Patent Laying-Open No. 192014/1988 describing the following technique. Since an interference color is liable to appear if a support film is attached to a polarizing film, the polarizing axis and the stretching direction are made to coincide in order to prevent an interference. Accordingly, an already caused interference color of an optical body cannot be effaced.

SUMMARY OF THE INVENTION

Therefore, it is a primary object of the present invention to provide a liquid crystal display device which includes a liquid crystal cell having birefringence as described above and a thin phase plate placed on the liquid crystal cell with the optical axis of the phase plate intersecting with that of the liquid crystal cell for preventing a shadow image. According to the present invention, retardation ($\Delta n \cdot d$) of a liquid crystal layer is set within the range of 600 nm to 1000 nm so as to enable a color compensation in the liquid crystal display device which is suited for a high level multiplexing drive and a phase compensation is applied to an optical laminated body forming an optical uniaxial substance. For the phase compensation, an optical uniaxial thin plate is used as the phase plate with a thickness of less than 500 nm. Alternatively, an uniaxial stretched resin sheet is used as the phase plate. Thus, an optical axis adjustment for the phase plate can be easily effected. It is also easy to handle the phase plate. Consequently, productivity is improved and a large-area display without shadow images has been provided.

Another feature of the present invention is that the retardation of the phase plate is adjusted based on the retardation of the liquid crystal layer. Thus, it becomes easy to adjust the saturation, hue and the like and the quality of the black-and-white display is enhanced.

A further feature of the present invention is that a pair of phase plates is arranged on each side of the liquid crystal layer. Alternatively, the phase plate is formed of materials having different inherent refractive factors. In a variant, the phase plate is formed of a plurality of laminated substances having optical axes intersecting orthogonally with each other. Thus, it becomes possible to suppress a shadow or remote-appearing image or a change in contrast due to parallax while also or simultaneously compensating for color interference of the liquid crystal layer.

By making use of the achromatic display according to the present invention, it becomes possible to provide a large-area display without a shadow image or a color display.

The foregoing and other objects, features, aspects and advantages of the present invention will become more apparent from the following detailed description of the present invention when taken in conjunction with the accompanying drawings.

DETAILED DESCRIPTION OF PREFERRED EXAMPLE EMBODIMENTS AND OF THE BEST MODE OF THE INVENTION

A liquid crystal display device having a high contrast value and suited for a high level multiplexing drive with a large duty ratio, among currently utilized field-effect type liquid crystal display devices, has a structure in which two polarizers hold therebetween a chiral nematic liquid crystal layer having a positive dielectric anisotropy, namely, a liquid crystal layer having a twisted structure of liquid crystal molecules with a twist angle of 180° to 300°.

Figure 1:
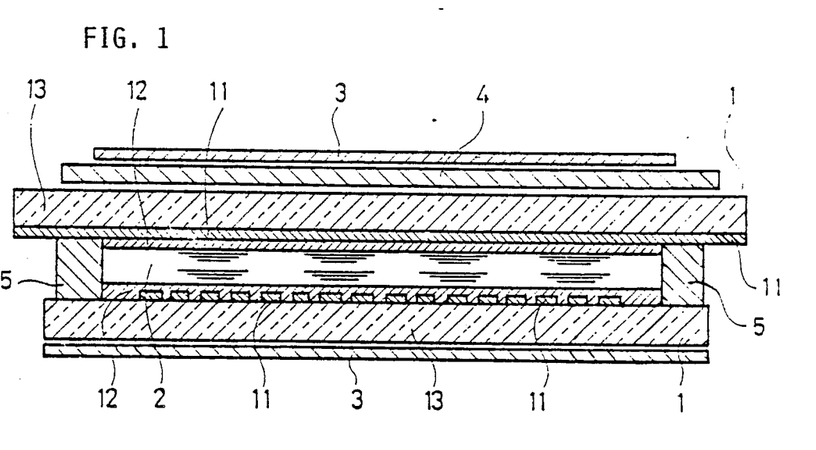
FIG. 1 is a sectional view of a liquid crystal display device according to an embodiment of the present invention.

FIG. 1 shows a sectional view of a liquid crystal display device according to an embodiment of the invention, where the above described structure is adopted. Substrates 1 are opposed to each other in this display device. Each substrate 1 includes a glass plate 13 having an inner surface on which transparent electrodes 11 and an orientation film 12 of liquid crystal molecules are provided. The transparent electrodes 11 on one substrate are located perpendicularly to those on the other substrate so as to represent a dot matrix display for example. Each orientation film 12 has been processed to homogenously orient the liquid crystal molecules. The substrates 1 are laminated in parallel by using sealing agents 5, to form a container. A chiral nematic phase liquid crystal layer 2 having a positive dielectric anisotropy is interposed between the substrates 1. This liquid crystal layer 2 has a structure wherein liquid crystal molecules are twisted with a twist angle of 180° to 300° and, for example, it is a 240° twist nematic layer. Two polarizers 3 are provided on respective outsides of the substrates 1 in a manner in which the liquid crystal layer 2 is held therebetween. A phase plate 4 of resin having a thickness of less than 500 $\mu$m is inserted between the liquid crystal layer 2 and one of the polarizers FIG. 1 with the optical axis of the phase plate 4 intersecting with the polarization axis of the polarizer 3.

The characteristics of the liquid crystal layer 2 will now be described in more detail. If the twist angle of liquid crystal molecules becomes large as described above, the product of the birefringence anisotropy $\Delta n$ and the thickness d of the liquid crystal layer, namely, the value of the retardation $\Delta n \cdot d$ (LC) has a direct effect on the quality of display and if a high-order interference occurs for example, color compensation cannot be effected by using the phase plate. More specifically, if the value $\Delta n \cdot d$ (LC) becomes smaller than 0.6, a light blue interference color appears and it is easy to compensate for the interference color. However, in that case, the transmissibility of the liquid crystal panel is considerably lowered and the display contrast value is deteriorated. Conversely, if the value $\Delta n \cdot d$ (LC) is larger than 1.0, the transmitted light becomes yellow and it is difficult to effect color compensation by using the phase plate 4. If the value $\Delta n \cdot d$ (LC) becomes larger, a larger interference occurs and color control cannot be effected. Accordingly, the value $\Delta n \cdot d$ (LC) is preferably in the range of more than 0.55 and less than 1.2 and more preferably in the range of more than 0.6 and less than 1.0.

The above described phase plate 4 can be formed by laminating sheets of uniaxially stretched polymeric resin materials such as polyvinyl butyrol, polyvinyl alcohol, polyester, cellulose acetate, cellulose butyrate, polyproylene, or polycarbonate.

The optical characteristics of the liquid crystal layer 2 change dependent on the presence or absence of an electric field for providing a display and if the laminated optical devices have a large thickness, a shadow or remote-appearing image or a change in contrast may occur due to parallax. Since according to the invention the phase plate has an optical uniaxial characteristic which is different from a conventional laminate of two liquid crystal panels, such phenomenon does not occur conspicuously. However, if the phase plate has a large thickness, such phenomenon can be observed. In order to suppress such phenomenon, it is desirable to set the thickness of the liquid crystal layer 2 smaller than 10 $\mu$m, the value $\Delta n \cdot d$ (LC) in the range from 0.6 to 1.0 and the total thickness of the phase plate 4 smaller than 0.5 mm and more preferably in the range from 25 $\mu$m to 160 $\mu$m.

The optical characteristics in the case of combining the liquid crystal layer and the phase plate now will be described in more detail.

The liquid crystal layer 2 should satisfy in principle the same conditions as those in a conventional display mode with a large twist angle of the liquid crystal molecules utilizing birefringence, referred to hereinafter as a supper twisted (ST) mode. However, as a result of detailed examinations, it was found that the liquid crystal layer 2 exhibits complicated optical characteristics combined with optical characteristic due to the birefringence of the liquid crystal molecules and a rotary polarization due to the twisted structure.

Therefore, in order to compensate for the interference color of the liquid crystal layer, the liquid crystal layer is made to closely resemble an optical uniaxial substance.

This will be described with reference to FIG. 2. In general, in order to obtain a maximum contrast when a uniaxial substance is held by an orthogonal Nicols prism, the polarization axis P of a polarizer is caused to deviate by 45° from the optical axis S of the optical uniaxial substance as is well known.

However, in the case of a liquid crystal layer, a rotary polarization occurs since liquid crystal molecules have a twisted structure, with a twist angle $\phi$, and the optical axis rotates according to the twist direction. Thus, the above described condition cannot be satisfied precisely.

Taking those difficulties into consideration, the spectrum of transmitted light was examined by setting an angle $\beta$ formed between the polarization axis of one polarizer and the orientation direction of liquid crystal molecules adjacent to the polarizer to 45° and rotating the other polarizer. As a result, it was found that there are two angles exhibiting transmitted light intensity characteristics corresponding to an optical uniaxial substance in the visible radiation range. It was found in those examinations that an angle α formed between the polarization axis P of the rotated polarizer and the axis L of the liquid crystal molecules adjacent thereto is approximately 45° or 135° in the same direction as the twist direction of the liquid crystal molecules with respect to the axis of the liquid crystal molecules.

Based on the foregoing conditions, examinations were carried out by using a polarizing microscope to determine an equivalence of a liquid crystal laminate body to an optical uniaxial substance. FIG. 2 shows the results of these examinations. More specifically, FIG. 2 shows optical characteristics which enable a compensation for only rotary polarization caused by the twist structure. Based on these optical characteristics, the optical characteristics of the phase plate are adjusted so that the laminate body of the liquid crystal layer and the phase plate may form or be an optical uniaxial substance. Thus, according to FIG. 2, the color can be made achromatic by phase compensation with respect to an a column or b column, and in that case, a difference between the heights of the a and b columns appears as a contrast.

Figure 2:
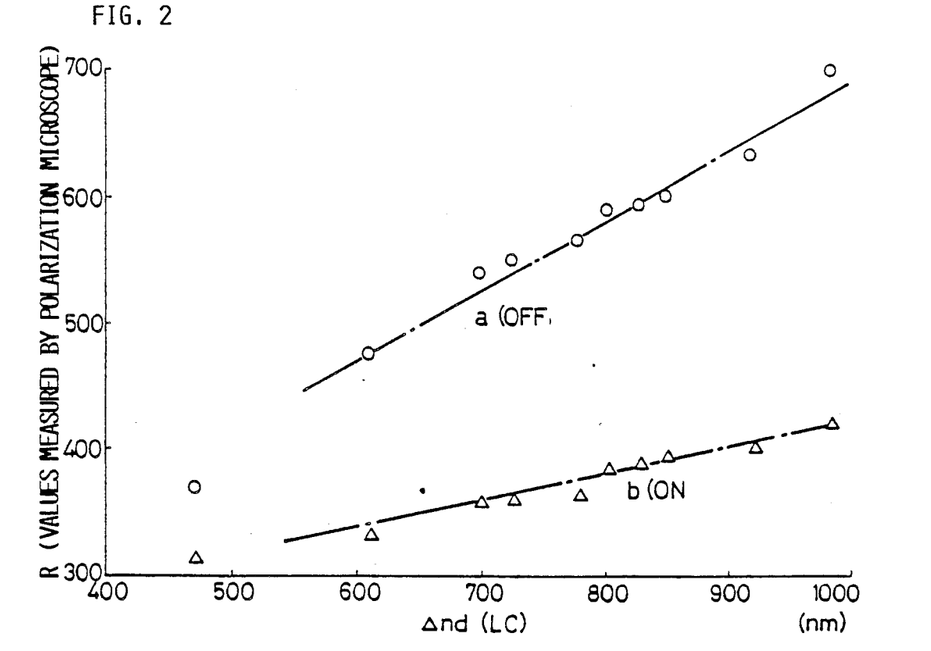
FIG. 2 is a graph showing a relation of the retardation R as a function of wavelength, as utilized in the principle of the present invention.

According to an experimental expression obtained based on the above described principle in a liquid crystal display device with a twist angle of 180° to 300° of liquid crystal molecules, if the retardation $\Delta n \cdot d$ (LC) of the liquid crystal layer and the retardation $\Delta n \cdot d$ (PH) of the phase plate satisfy the below relation (A):

$$0.6 \times \Delta n \cdot d(LC) + 60 < \Delta n \cdot d(PH) < 0.6 \times \Delta n \cdot d(LC) - 210 (nm).$$

compensation of a in FIG. 2 is achieved and the basic mode in this case is a transmission type negative display mode.

In the above described example, a high contrast value was obtained when an angle δ formed between the optical axis of the phase plate and the orientation direction of the liquid crystal molecules adjacent thereto, was in the range from 70° to 110° and an angle β formed between the polarization axis of the polarizer and the orientation direction of the liquid crystal molecules adjacent thereto was in the range from 30° to 60°.

Similarly, an experimental expression which enables the compensation for b in FIG. 2 is represented as relation (B):

$$(7.5 \times 10^{-4})(\Delta n \cdot d(LC) - 400)^2 + 150 < \Delta n \cdot d(PH) < (7.5 \times 10^{-4})(\Delta n \cdot d(LC) - 400)^2 + 300 \; nm$$

This relation (B) means, in comparison with the relation (A), that the phase plate utilized has an optical path difference smaller than that of the liquid crystal cell by about a ½ wavelength of the visible radiation range and the basic mode is a reflection type positive display mode.

In either of the relations (A) or (B), reversal of negative and positive displays can be made if one of the polarizers is rotated by 90°. More specifically, the above described angles may be set with respect to either the polarization axis or the absorption axis of the polarizer.

In order to suppress blurs in the adjustment of the retardation $\Delta n \cdot d$ (LC) of the liquid crystal layer or temperature dependency, the angle δ needs to deviate from 90° in either direction. More specifically, the angle δ is most preferably in the range from 70° to 88° or in the range from 92° to 110°.

Typical examples according to the above described conditions are shown below.

| | Example of Relational Expression (A) | | | |
| | Lot | | | |
| | a | b | c | b |
|---|---|---|---|---|
| mode | negative | negative | negative | positive |
| β | 45° | 45° | 45° | 45° |
| γ | 45° | 45° | 45° | 45° |
| δ | 90° | 90° | 100° | 100° |
| Δn · d (LC) | 610 nm | 730 nm | 850 nm | 980 nm |
| Δn · d (PH) | 450 nm | 550 nm | 620 nm | 690 nm |
| Contrast | 16 | 21 | 30 | 25 |

| | Example of Relational Expression (B) | | | |
| | Lot | | | |
| | e | f | g | h |
|---|---|---|---|---|
| mode | positive | negative | positive | positive |
| β | 45° | 45° | 45° | 45° |
| γ | 45° | 45° | 45° | 45° |
| δ | 100° | 90° | 90° | 100° |
| Δn · d (LC) | 610 nm | 730 nm | 850 nm | 980 nm |
| Δn · d (PH) | 270 nm | 310 nm | 400 nm | 480 nm |
| Contrast | 21 | 17 | 24 | 28 |

Figure 3:
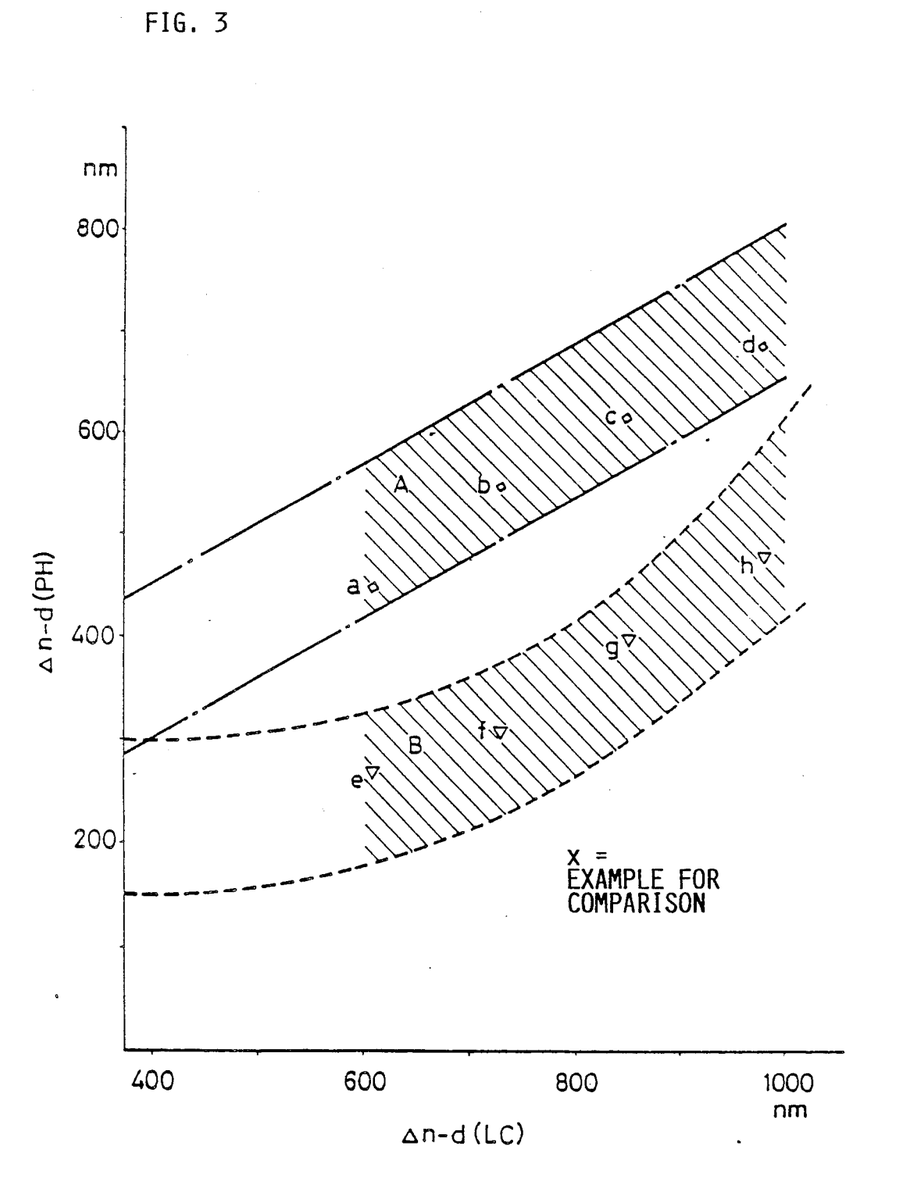
FIG. 3 is a characteristic diagram showing the retardation effects in a liquid crystal layer and in a phase plate according to the present invention.
Figure 4:
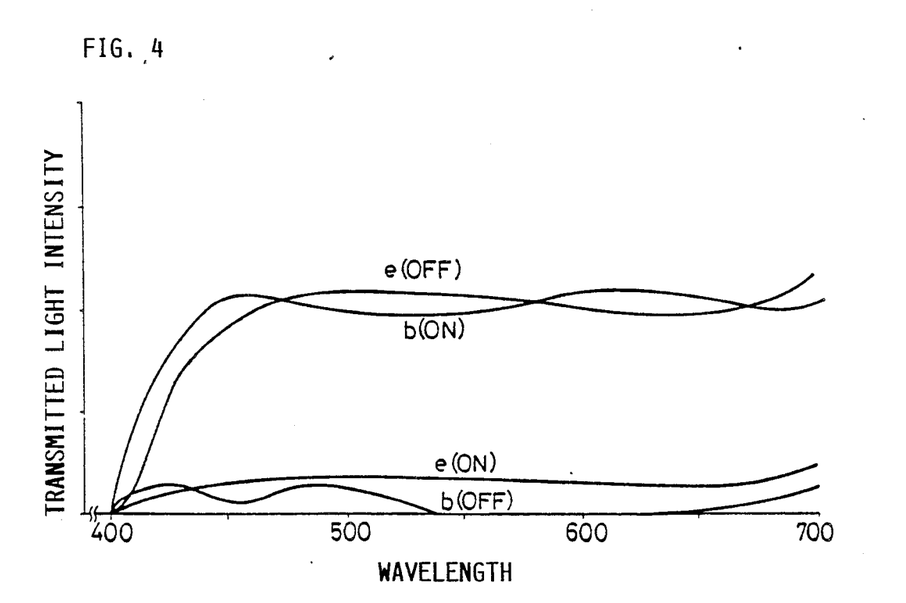
FIG. 4 is a display characteristic diagram of a liquid crystal display device according to an embodiment of the present invention showing the transmitted light intensity as a function of the wavelength.

FIG. 3 shows the relationships of the retardations. Referring to FIG. 3, hatched areas denoted by A and B are areas corresponding to the above indicated relational expressions. FIG. 4 shows characteristics in the base of a 1/200 duty multiplexing drive in typical display devices of the above indicated lots.

The above description of the liquid crystal display device relates to the case of using only one phase plate and observing the front display surface perpendicularly thereto. However, if the display area increases, it happens frequently that the display surface is observed obliquely. In consequence, it becomes necessary to lessen the dependency on the viewing cone.

In the above described resin phase plate, it is considered that a large number of polymeric chains are arranged in one direction. Accordingly, the length of a unit polymer projected on the liquid crystal layer differs dependent on whether the display device is observed in a direction normal to or inclined to the front surface of the display. This difference appears as blurs in the color compensation of the phase plate. These irregularities can be prevented effectively by forming the phase plate 4 as a laminate body of a plurality of sheets but it becomes difficult to handle the phase plate 4. For example, if the optical axes of the laminated sheets rotate a little from each other, the compensation can be made by the same principle as that in the conventional liquid crystal laminate body of two sheets; however, the optical axes change by steps which is different from the case of a twist nematic structure and accordingly the display is darkened and the contrast is lowered.

Figure 6:
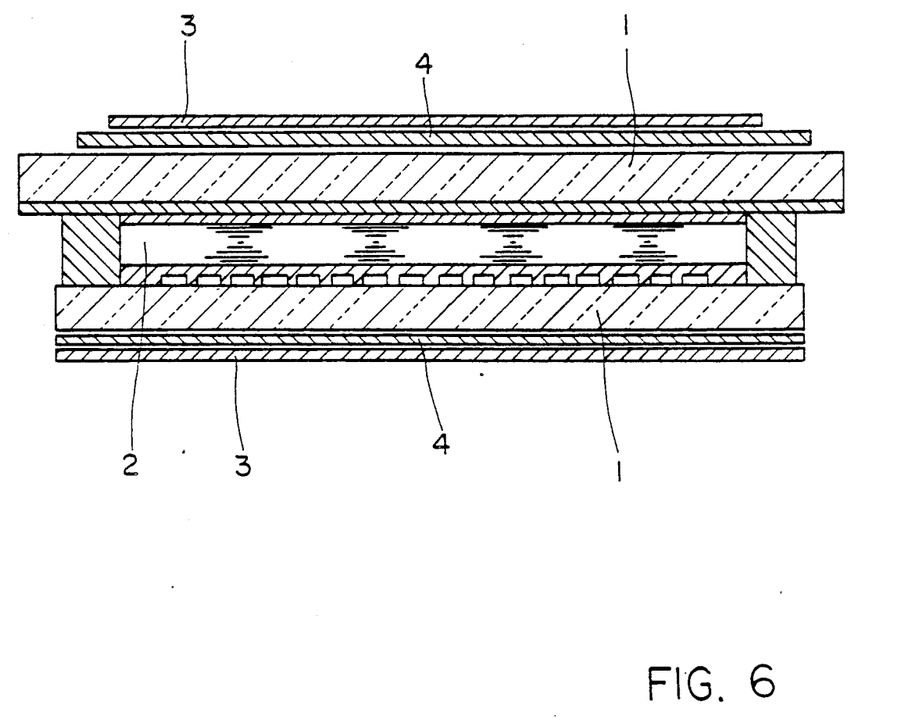
FIG. 6 shows a sectional view similar to that of FIG. 1, but illustrating the use of two phase plates.
Figure 7:
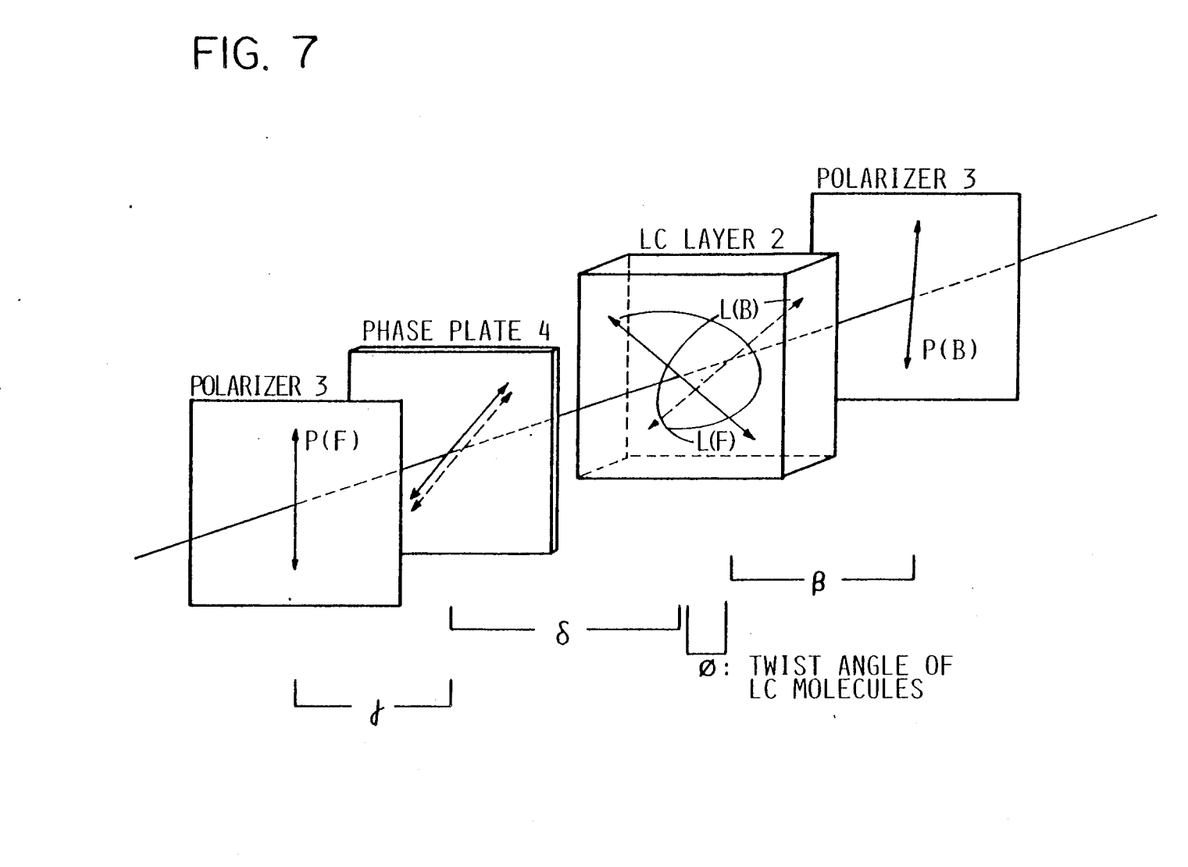
FIG. 7 shows the relationships of the angles $\gamma$, $\delta$, and $\beta$.

If a pair of phase plates is arranged on each side of the liquid crystal layer as shown in FIG. 6, coloring caused by the change of the observing direction can be further suppressed. In this case, since the projection direction of a unit polymer of the phase plate differs dependent on the upper or lower surface of the liquid crystal layer, the influence of expansion or reduction of the projection range can be considerably reduced.

In addition, the phase plate may be molded by a mixture of resin materials having different inherent birefringence factors or it may be formed as a laminate body of plates having different inherent birefringence factors. For example, a combination of polycarbonate and polystyrene is preferred. However, if a proportion of a combination is inadequate, the birefringence of the resin is lost and, therefore, it is necessary to adjust the proportion in the combination taking account the stretching ratio.

Further, the phase plate may be formed as a laminate body of resin films having their optical axes intersecting orthogonally with each other. For example, the phase plate in the above described example has its optical axis parallel to the main surface of the substrate and a resin material having its optical axis perpendicular to the surface of the substrate is placed on the above mentioned phase plate. According to this method, the expansion or reduction of the projection range of the unit polymer of the phase plate is offset dependent on the observing direction whereby the dependency on the viewing cone can be lessened.

Figure 5:
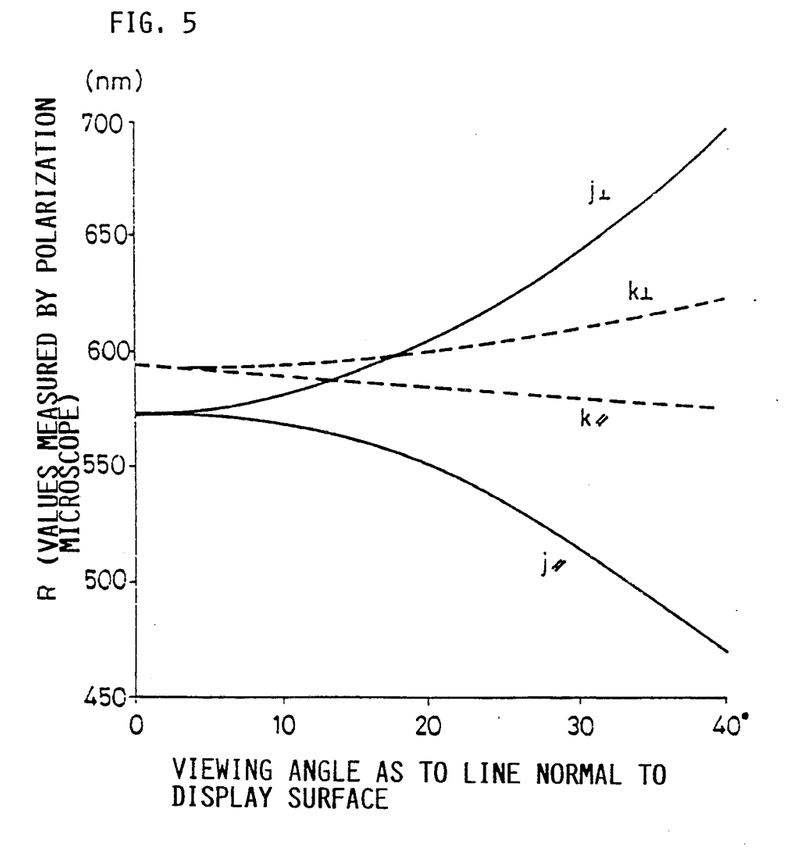
FIG. 5 shows two viewing cones representing the retardation R as a function of the viewing angle for phase plates according to another embodiment of the present invention.

FIG. 5 shows the dependency on the viewing cone in the case of a laminate body k formed by laminating a resin material of 110 μm in thickness having its optical axis extending perpendicularly to the main surface of the substrate on a phase plate of 70 μm in thickness, as one of the above mentioned examples, in comparison with a single body j of a phase plate. The abscissa in FIG. 5 represents a viewing angle with respect to a line perpendicular to the display surface. In each of the cases j|| and k|| the inclination is toward the stretching direction of the phase plate having a single body j||, or a laminate body k||. In each of the cases j⊥ and k⊥ the inclination in a direction perpendicular to the stretching direction of the phase plate having a single body j⊥ or a laminate body k⊥.

Thus, even in the case of using multiple layers as the phase plate, the quality of the display will be lowered unless the total thickness thereof is smaller than 500 μm.

As described in the foregoing, the present invention makes it possible to give a display with a non-colored beam, which enables a display of white color for the background and a black color obtained by interception of the beam, in a manner in which the beam applied through birefringence rotary polarization in the liquid crystal panel is compensated as an optical uniaxial substance. Thus, a display with a high quality can be achieved as if black images are printed on white paper, and thus a high contrast is obtained. Since this display can be reversed from black to white or vice versa, both a negative display and a positive display can be made. In addition, since the display is achromatic, a color display can be obtained by using filters of three colors.

Since only one liquid crystal panel is used and the phase plate can be manufactured by molding, the display device can be manufactured with a good productivity at low cost and it can be made to have a large display area. Furthermore, since the entire body of the liquid crystal display device can be made thin, deviation in a display position or change in contrast due to parallax does not occur.

A liquid crystal display device according to the present invention has a thin thickness and it is capable of providing a black-and-white display and it is suitable for a high level multiplexing drive. Accordingly it can be utilized as a large-area display device of a dot matrix type or as a display of a word processor, a personal computer or the like. In addition, it can be also utilized as a color display in such a display device.

What is claimed is:

1. A liquid crystal display device comprising: two substrate plates, a chiral nematic liquid crystal layer disposed between said substrate plates, said chiral nematic liquid crystal layer having a thickness d less than 10 μm and a birefringence, said liquid crystal layer being oriented homogeneously at least near inner surfaces of said substrate plates, polarizers provided on the outer side of said substrate plates, and at least one phase plate inserted between said liquid crystal layer and one of said polarizers, wherein a product $\Delta n \cdot d$ (LC) of a birefringence anisotropy $\Delta n$ and said thickness d of said liquid crystal layer is within the range of 600 to 1000 nm and said phase plate has a thickness of less than 500 μm and an optical axis intersecting with a polarization axis or an absorption axis of said polarizer adjacent thereto, wherein an intersection angle $\gamma$ satisfies: $\gamma \neq 0$, whereby a shadow image and coloring are avoided, and wherein said chiral nematic liquid crystal layer has a positive dielectric anisotropy and a twisted structure wherein liquid crystal molecules are twisted with a twist angle of 180° to 300°, and said product $\Delta n \cdot d$ (LC) and a product $\Delta n \cdot d$ (PH) of a birefringence anisotropy $\Delta n$ and a thickness d of said phase plate satisfy the following condition:

$$0.6\Delta n \cdot d(LC) + 60 < \Delta n \cdot d(PH) < 0.6\Delta n \cdot d(LC) + 210 (nm).$$

2. The liquid crystal display of claim 1, wherein said phase plate is optically uniaxial with its optical axis having an angle δ from 70° to 110° with respect to the orientation direction of liquid crystal molecules adjacent to said phase plate, and a polarization axis or absorption axis of the related polarizer has an angle β from 30° to 60° with respect to the orientation direction of liquid crystal molecules adjacent to said polarizer.

3. The liquid crystal display device of claim 1, wherein said phase plate is a uniaxially stretched resin sheet and the stretching direction has an angle γ from 20° to 60° with respect to a polarization axis or an absorption axis of the polarizer adjacent thereto.

4. The liquid crystal display device of claim 2, wherein the angle δ formed between the optical axis direction or the stretching direction of said phase plate and the orientation direction of liquid crystal molecules adjacent to said phase plate differs from 90°.

5. The liquid crystal display device of claim 1, wherein another phase plate is provided between said liquid crystal layer and the other of said polarizers.

6. The liquid crystal display device of claim 1, wherein said phase plate includes a laminate body of a plurality of layers formed of materials of different inherent birefringence factors and wherein the intersection angle γ is formed by the optic axis of the layer of said plurality of layers which is uppermost and adjacent to said polarizer.

7. The liquid crystal display device of claim 1, wherein said phase plate includes a laminate body of a plurality of layers and wherein the intersection angle γ is formed by the optic axis of the layer of said plurality of layers which is uppermost and adjacent to said polarizer, and one of said plurality of layers has an optical axis perpendicular to the surface of said substrate plates.

8. The liquid crystal display device of claim 3, wherein the angle δ formed between the optical axis direction or the stretching direction of said phase plate and the orientation direction of liquid crystal molecules adjacent to said phase plate differs from 90°.

9. A liquid crystal display device comprising: two substrate plates, a chiral nematic liquid crystal layer disposed between said substrate plates, said chiral nematic liquid crystal layer having a thickness d less than 10 μm and a birefringence, said liquid crystal layer being oriented homogeneously at least near inner surfaces of said substrate plates, polarizers provided on the outer side of said substrate plates, and at least one phase plate inserted between said liquid crystal layer and one of said polarizers, wherein a product $\Delta n \cdot d$ (LC) of a birefringence anisotropy $\Delta n$ and said thickness d of said liquid crystal layer is within the range of 600 to 1000 nm and said phase plate has a thickness of less than 500 μm and an optical axis intersecting with a polarization axis or an absorption axis of said polarizer adjacent thereto, wherein an intersection angle $\gamma$ satisfies: $\delta \neq 0$, whereby a shadow image and coloring are avoided, and wherein said chiral nematic liquid crystal layer has a positive dielectric anisotropy and a twisted structure wherein liquid crystal molecules are twisted with a twist angle of 180° to 300°, and said product $\Delta n \cdot d$ (LC) and a product $\Delta n \cdot d$ (PH) of a birefringence anisotropy $\Delta n$ and a thickness d of said phase plate satisfy the following condition:

$(7.5 \times 10^{-4})(\Delta n \cdot d(LC) - 400)^2 - 150 < \Delta n \cdot d(PH) <$ $(7.5 \times 10^{-4})(\Delta n \cdot d(LC) - 400)^2 + 300 (nm)$.

10. The liquid crystal display device of claim 9, wherein said phase plate is optically uniaxial with its optical axis having an angle $\delta$ from 70° to 110° with respect to the orientation direction of liquid crystal molecules adjacent to said phase plate, and a polarization axis or absorption axis of the related polarizer has an angle $\beta$ from 30° to 60° with respect to the orientation direction of liquid crystal molecules adjacent to said polarizer.

11. The liquid crystal display device of claim 9, wherein said phase plate is a uniaxially stretched resin sheet and the stretching direction has an angle $\gamma$ from 20° to 60° with respect to a polarization axis or an absorption axis of the polarizer adjacent thereto.

12. The liquid crystal display device of claim 10, wherein the angle $\delta$ formed between the optical axis direction or the stretching direction of said phase plate and the orientation direction of liquid crystal molecules adjacent to said phase plate differs from 90°.

13. The liquid crystal display device of claim 9, wherein another phase plate is provided between said liquid crystal layer and the other of said polarizers.

14. The liquid crystal display device of claim 9, wherein said phase plate includes a laminate body of a plurality of layers formed of materials of different inherent birefringence factors and wherein the intersection angle $\gamma$ is formed by the optic axis of the layer of said plurality of layers which is uppermost and adjacent to said polarizer.

15. The liquid crystal display device of claim 9, wherein said phase plate includes a laminate body of a plurality of layers and wherein the intersection angle $\gamma$ is formed by the optic axis of the layer of said plurality of layers which is uppermost and adjacent to said polarizer, and one of said plurality of layers has an optical axis perpendicular to the surface of said substrate plates.

16. The liquid crystal display device of claim 11, wherein the angle $\delta$ formed between the optical axis direction or the stretching direction of said phase plate and the orientation direction of liquid crystal molecules adjacent to said phase plate differs from 90°.

* * * * *

UNITED STATES PATENT AND TRADEMARK OFFICE
CERTIFICATE OF CORRECTION

PATENT NO. : 5,119,220
DATED : June 2, 1992
INVENTOR(S) : Kenichi Narita et al.

It is certified that error appears in the above-identified patent and that said Letters Patent is hereby corrected as shown below:

On the title page: PCT NO:

In [86] § 371 Date:, please replace "Jul. 26, 1989" by
-- June 26, 1989--.

In [86] § 102(e) Date:, please replace " Jul. 26, 1989" by
-- June 26, 1989--.

In claim 9, column 9, line 19, replace " $\delta \neq 0$" by
-- $\gamma \neq 0$ --.

Signed and Sealed this

Fifth Day of October, 1993

Attest:

BRUCE LEHMAN

Attesting Officer   Commissioner of Patents and Trademarks